(12) United States Patent
Carter et al.

(10) Patent No.: US 9,456,335 B2
(45) Date of Patent: Sep. 27, 2016

(54) METHOD AND SYSTEM FOR DEFINING AN OFFLINABLE MODEL GRAPH

(71) Applicant: Oracle International Corporation, Redwood Shores, CA (US)

(72) Inventors: Wayne Carter, San Francisco, CA (US); Donald Creig Humes, Yorktown, VA (US)

(73) Assignee: Oracle International Corporation, Redwood Shores, CA (US)

( * ) Notice: Subject to any disclaimer, the term of this patent is extended or adjusted under 35 U.S.C. 154(b) by 29 days.

(21) Appl. No.: 14/068,790

(22) Filed: Oct. 31, 2013

(65) Prior Publication Data

US 2015/0087276 A1    Mar. 26, 2015

Related U.S. Application Data

(60) Provisional application No. 61/880,901, filed on Sep. 21, 2013.

(51) Int. Cl.
*H04W 8/18* (2009.01)
*H04W 4/00* (2009.01)
*G06F 17/30* (2006.01)

(52) U.S. Cl.
CPC .......... *H04W 8/18* (2013.01); *G06F 17/30902* (2013.01); *H04W 4/001* (2013.01)

(58) Field of Classification Search
None
See application file for complete search history.

(56) References Cited

U.S. PATENT DOCUMENTS

| 5,319,766 | A | * | 6/1994 | Thaller et al. | 711/146 |
| 5,815,811 | A | * | 9/1998 | Pinard et al. | 455/434 |
| 6,108,769 | A | * | 8/2000 | Chinnakonda et al. | 712/216 |
| 7,143,241 | B2 | * | 11/2006 | Hull | 711/133 |
| 8,224,951 | B2 | * | 7/2012 | Neil et al. | 709/224 |
| 2002/0124011 | A1 | * | 9/2002 | Baxter et al. | 707/200 |
| 2006/0005263 | A1 | * | 1/2006 | Hardt | G06F 21/33 726/28 |
| 2006/0112398 | A1 | | 5/2006 | Mukkamala et al. | 719/316 |
| 2010/0257230 | A1 | | 10/2010 | Kroeger et al. | 709/203 |

* cited by examiner

*Primary Examiner* — Ashish K Thomas

(57) ABSTRACT

A method and system for defining an offlinable model graph. In one embodiment of the method, a request is generated by a mobile device. The mobile device receives a response to the request. The mobile device updates a plurality of tables stored in memory of the mobile device, wherein the updating comprises adding a component of the response to a first table of the plurality of tables.

20 Claims, 17 Drawing Sheets

Views Table

| UR | View URI | |
|---|---|---|
| file://...contacts#list | view://contacts#list | ← 702 |
| | view://contacts/101#list | |
| | view://contacts/102#list | |

Collections Table

| Collection URI | ← 704 |
|---|---|
| model://contacts | |

Entities Table

| Entity URI | ← 706 |
|---|---|
| model://contacts/101 | |
| model://contacts/102 | |

Fields Table ← 710

| Field URI | Field Name URI | Value | Source URI |
|---|---|---|---|
| model://contacts/101/name | model://contacts#name | Labron James | |
| model://contacts/102/name | model://contacts#name | Mike Adams | |

Collection_Entities Table ← 712

| Collection URI | Entity URI |
|---|---|
| model://contacts | model://contacts/101 |
| model://contacts | model://contacts/102 |

Collection_Views Table ← 716

| Collection URI | View URI |
|---|---|
| model://contacts | view://contacts#list |

Entity_Fields Table ← 714

| Entity URI | Field URI |
|---|---|
| model://contacts/101 | model://contacts/101/name |
| model://contacts/102 | model://contacts/102/name |

Entity_Views Table ← 720

| Entity URI | View URI |
|---|---|
| model://contacts/101 | view://contacts/101#detail |
| model://contacts/102 | view://contacts/102#detail |

*FIG. 7B*

Views Table

| UR | View URI | |
|---|---|---|
| file://...contacts#list | view://contacts#list | ← 702 |
| *file://...contacts/101#detail* | view://contacts/101#list | |
| | view://contacts/102#list | |
| | *view://accounts201#detail* | |

Collections Table

| Collection URI | ← 704 |
|---|---|
| model://contacts | |
| *model://accounts* | |

Entities Table

| Entity URI | ← 706 |
|---|---|
| model://contacts/101 | |
| model://contacts/102 | |
| *model://accounts/201* | |

Fields Table ← 710

| Field URI | Field Name URI | Value | Source URI |
|---|---|---|---|
| model://contacts/101/name | model:/contacts#name | Labron James | |
| model://contacts/102/name | model:/contacts#name | Mike Adams | |
| *model://contacts/101/accountName* | *model://contacts#accountName* | | *model://accounts/201/name* |
| *model://accounts/201/name* | *model://contacts#accountName* | *Acme Bike Corp.* | |

Collection_Entities Table ← 712

| Collection URI | Entity URI |
|---|---|
| model://contacts | model://contacts/101 |
| model://contacts | model://contacts/102 |
| *model://accounts* | *model://accounts/201* |

Collection_Views Table ← 716

| Collection URI | View URI |
|---|---|
| model://contacts | view://contacts#list |

Entity_Fields Table ← 714

| Entity URI | Field URI |
|---|---|
| model://contacts/101 | model://contacts/101/name |
| model://contacts/102 | model://contacts/102/name |
| | |

Entity_Views Table ← 720

| Entity URI | View URI |
|---|---|
| model://contacts/101 | view://contacts/101#detail |
| model://contacts/102 | view://contacts/102#detail |
| *model://accounts/201* | *view://accounts/201#detail* |

*FIG. 7C*

Views Table

| URI | View URI |
|---|---|
| file://...contacts#list | view://contacts#list |
| file://...contacts/101#detail | view://contacts/101#list |
|  | view://contacts/102#list |
| *file://...accounts201#detail* | view://accounts201#detail |

702

Collections Table  704

| Collection URI |
|---|
| model://contacts |
| model://accounts |

Entities Table  706

| Entity URI |
|---|
| model://contacts/101 |
| model://contacts/102 |
| model://accounts/201 |

Fields Table  710

| Field URI | Field Name URI | Value | Source URI |
|---|---|---|---|
| model://contacts/101/name | model:/contacts#name | Labron James |  |
| model://contacts/102/name | model:/contacts#name | Mike Adams |  |
| model://contacts/101/accountName | model://contacts#accountName |  | model://accounts/201/name |
| model://accounts/201/name | model://contacts#accountName | *Acme Corp.* |  |

Collection_Entities Table  712

| Collection URI | Entity URI |
|---|---|
| model://contacts | model://contacts/101 |
| model://contacts | model://contacts/102 |
| model://accounts | model://accounts/201 |

Collection_Views Table  716

| Collection URI | View URI |
|---|---|
| model://contacts | view://contacts#list |

Entity_Fields Table  714

| Entity URI | Field URI |
|---|---|
| model://contacts/101 | model://contacts/101/name |
| model://contacts/102 | model://contacts/102/name |
| *model://accounts/201* | *model://accounts/201/name* |

Entity_Views Table  720

| Entity URI | View URI |
|---|---|
| model://contacts/101 | view://contacts/101#detail |
| model://contacts/102 | view://contacts/102#detail |
| model://accounts/201 | view://accounts/201#detail |

*FIG. 7D*

METHOD AND SYSTEM FOR DEFINING AN OFFLINABLE MODEL GRAPH

RELATED APPLICATIONS

This application claims the domestic benefit under Title 35 of the United States Code §119(e) of U.S. Provisional Patent Application Ser. No. 61/880,901, entitled "Method and System for Defining an Offlinable Model Graph," filed Sep. 21, 2013, which is hereby incorporated by reference in its entirety and for all purposes as if completely and fully set forth herein.

BACKGROUND OF THE INVENTION

Enterprise applications provide valuable services to businesses including customer relationship management (CRM), resource planning, human resource management, etc. The present invention will be described with reference to an example CRM that provides sales and marketing services, it being understood that the present invention should not be limited thereto.

CRM is a widely implemented strategy for managing a company's interaction with customers. CRM services can be accessed through mobile devices (e.g., smart phones or tablet computers). The present invention will be described with reference to providing CRM services to users via their mobile devices, it being understood the present invention should not be limited thereto.

SUMMARY

A method and system for defining an offlinable model graph. In one embodiment of the method, a request is generated by a mobile device. The mobile device receives a response to the request. The mobile device updates a plurality of tables stored in memory of the mobile device, wherein the updating comprises adding a component of the response to a first table of the plurality of tables.

BRIEF DESCRIPTION OF THE DRAWINGS

FIGS. 7A-7D graphically illustrates an example data store in memory on the mobile device employed of FIG. 6.

FIG. 12, which is distributed across

The use of the same reference symbols in different drawings indicates similar or identical items.

DETAILED DESCRIPTION

Today's sales workforce is more mobile than ever. To better aid the mobile sales workforce, many companies employ mobile CRM, which enables users to more efficiently use CRM services such as creating, reviewing, and/or updating sales opportunities, sales accounts, contacts, calendar events, etc., through user interfaces or "views" displayed on mobile devices.

Figure 1:
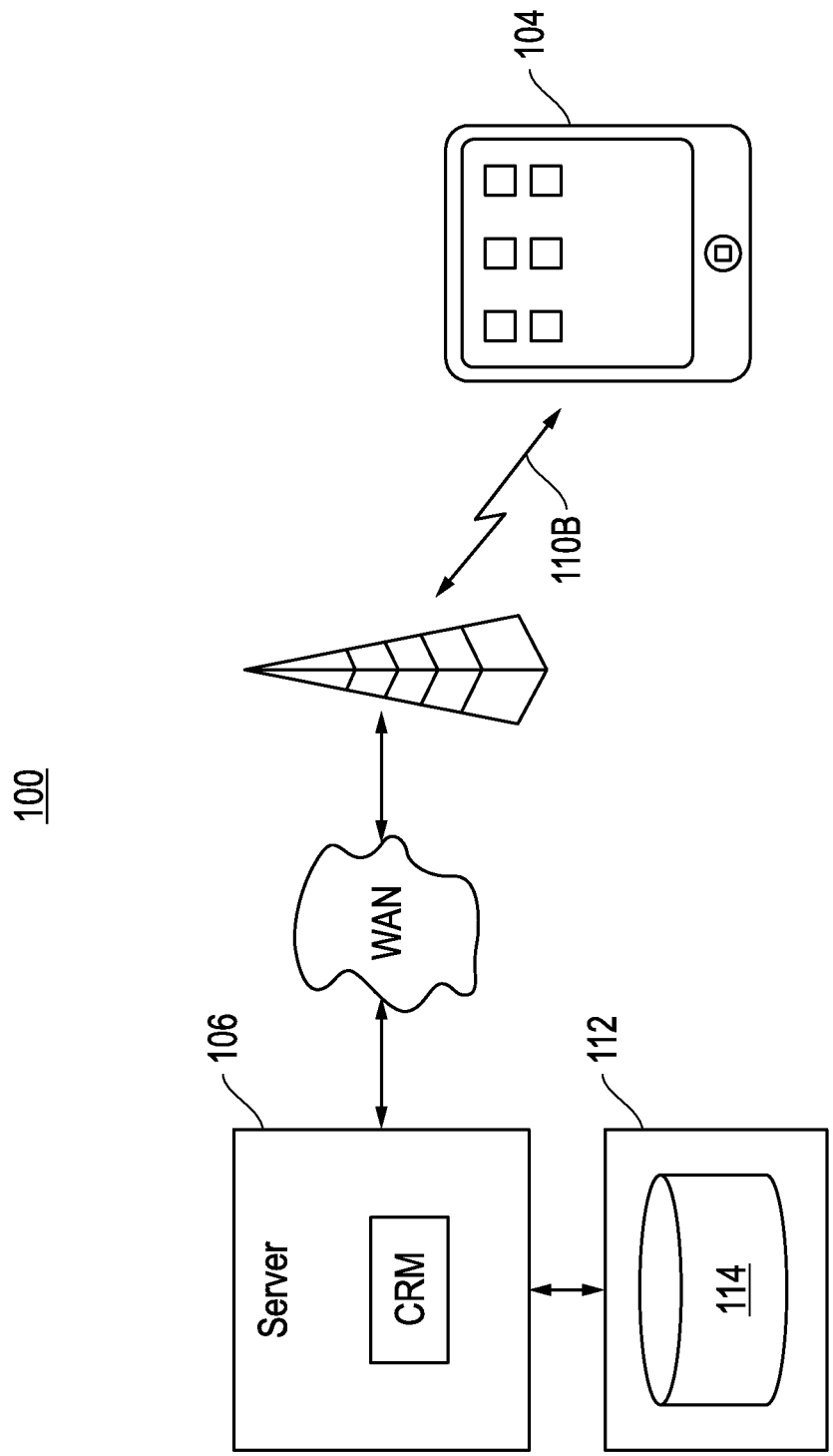
FIG. 1 is a block diagram illustrating relevant components of an example system that employs mobile CRM.

FIG. 1 illustrates in block diagram form, relevant components of an example system 100 that provides mobile CRM. System 100 includes a mobile device (e.g., smart phone) 104 in wireless data communication with a CRM executing on server 106. Services provided by the CRM can be accessed through views displayed by mobile device 104.

In one embodiment, the CRM implements a model-view-controller architecture. The CRM includes a state driven application that contains multiple page definitions, which form the basis of views that can be displayed by mobile device 104. In response to receiving a view request from mobile device 104, the CRM merges or binds components (e.g., account names, contact names, etc.) from a logical data model with a selected page definition, the result of which is sent to the mobile device 104 as a view definition in a reply after additional processing (e.g., universal resource indicator (URI) insertion, archiving, rendering and/or serialization). Mobile device 104 receives and renders the view definition for display. For purposes of explanation, this disclosure presumes that any view definition received by a mobile device contains merged components (e.g., account names, contact names, etc.) in condition for rendering and subsequent display. Mobile device may perform preprocessing (e.g., deserialization, data reconciliation, local storage update, etc.) before the view definition is rendered for subsequent display.

Figure 2:
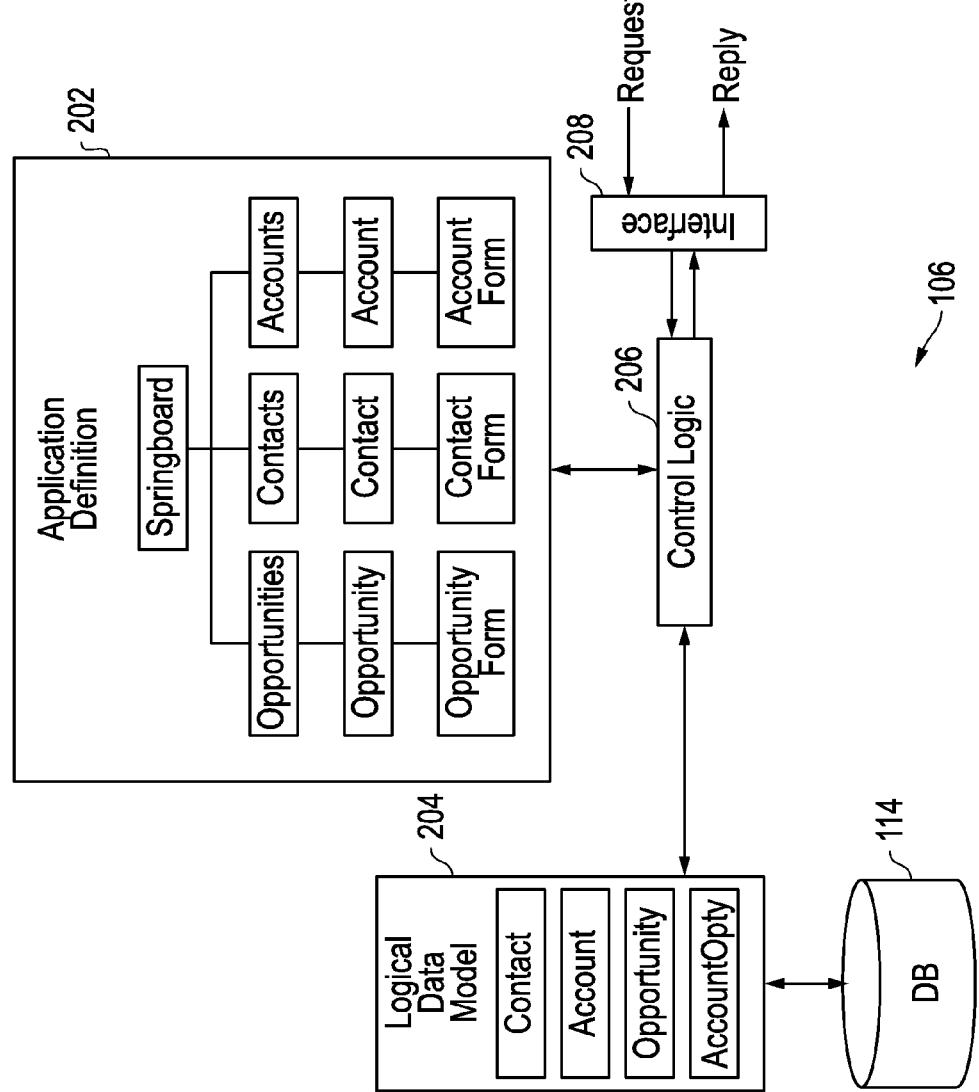
FIG. 2 is a block diagram of relevant components of an example server employed in FIG. 1.

With continuing reference to FIG. 1, FIG. 2 illustrates an example of server 106 with relevant components shown in block diagram form. Memory 202 stores an application definition for the CRM. The application definition includes page definitions, some of which are represented in memory 202. The "Springboard" page definition can be used to render a springboard view for display on a mobile device, which enables user access to mini-applications or high level business objects within the logical data model. The "Accounts," "Opportunities," and "Contacts" page definitions can be used to render views for display on mobile devices that present names of accounts, opportunities, and contacts, respectively, in a list format. The "Account," "Opportunity," and "Contact" page definitions can be used to render views for displays that provide detailed information for an account, opportunity, and contact, respectively, in a form format. The "Account Form," "Opportunity Form," and "Contact Form" page definitions can be used to render views for display that provide information for an account, opportunity, and contact, respectively, in a user editable form. Other page definitions in memory 202 are contemplated. In general, page definitions can be used to render logical data model 204 into a form more suitable for interaction by a user of a mobile device via views displayed thereon. In one sense, logical data model 204 provides access to business objects including accounts, contacts, opportunities, etc., some of which are shown in FIG. 2.

The application definition in memory 202 can be implemented as a state driven application that is built using Java Server Faces (JSF) technology, it being understood the present invention should not be limited thereto. JSF provides standard, reusable components for creating pages for views. JSF provides useful, special tags to enhance view definitions. As will be more fully described below, the present invention can extend JSF (or a similar technology for building a state driven application) with a new feature that enables insertion of a new type of tag (e.g. URIs) into view definitions before the view definitions are sent to mobile devices. These new tags, as will be more fully described below, enable multiple features. For example, the tags allow mobile devices to extract model data from view, and the tags enable mobile devices to display views when the mobile devices are "offline" or lack data communication with the CRM.

Control logic 206, which may take form in instructions executing on a processor, is in data communication with the application definition. Control logic 206 can receive a view request from mobile device 104 via interface 208. In response to receiving the view request, control logic 206 may access the application definition in memory 202 or a view navigation stack (not shown) to select an appropriate page definition for creating the reply. The page definition can be selected based on information contained in the view request in addition to other information.

Figure 3:
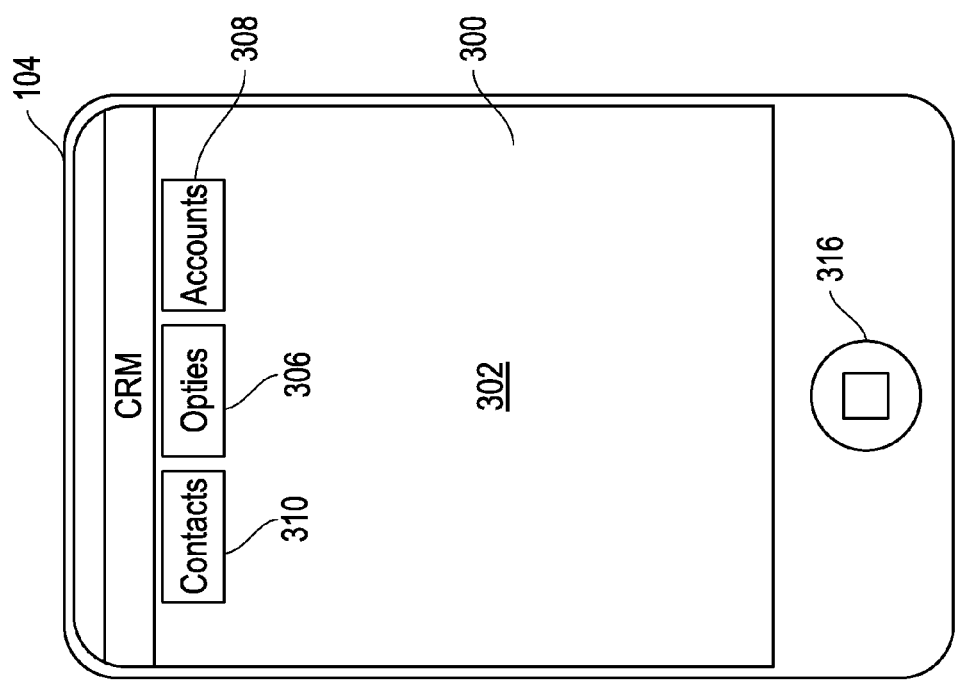
FIG. 3 graphically illustrates an example page displayed on a mobile device employed in FIG. 1.
Figure 5:
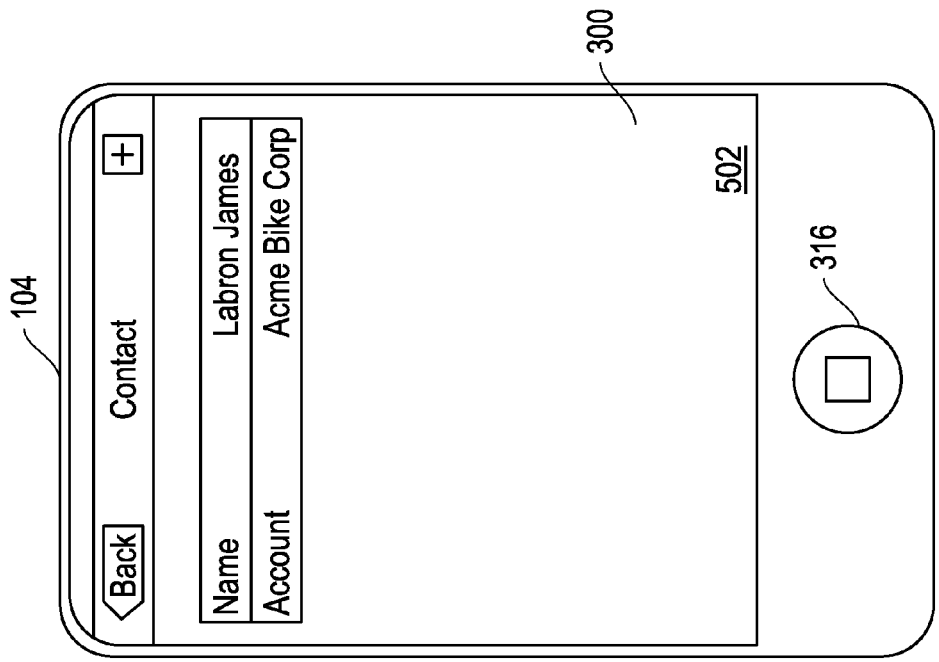
FIG. 5 graphically illustrates an example page displayed on a mobile device employed in FIG. 1.
Figure 4:
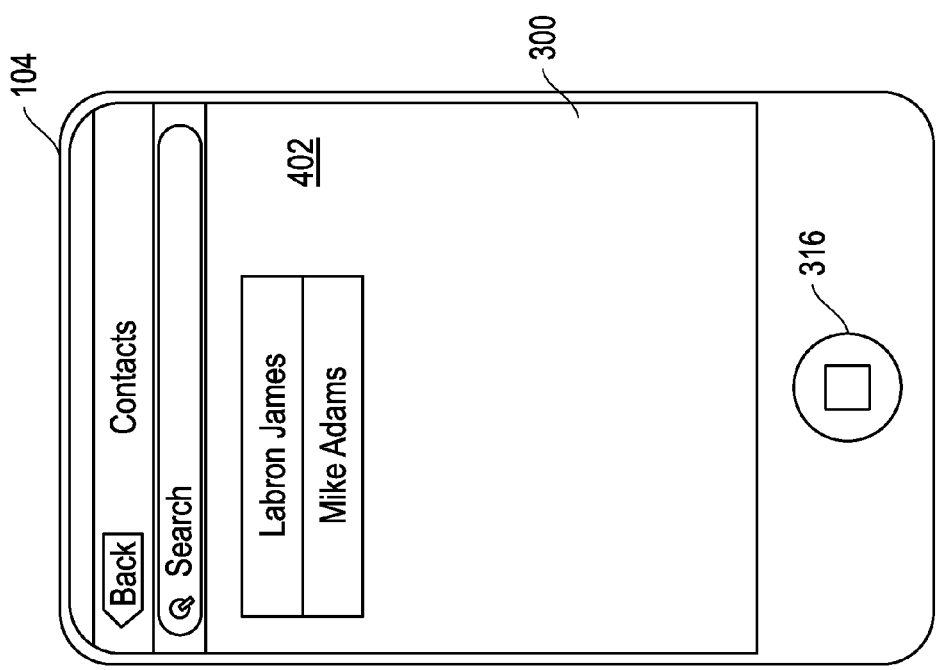
FIG. 4 graphically illustrates an example page displayed on a mobile device employed in FIG. 1.

The page definition contains metadata that can be used to select components (e.g., account names, contact names, etc.) from logical data model 204 that are needed to create the reply. Control logic 206 can make calls to logical data model 204 to retrieve the needed view components. Control logic 206 can then bind or merge the selected page definition with the retrieved components, the result of which is transmitted to the requesting mobile device as a view definition in a reply after some additional processing. The reply may also contain an archive that is more fully described below. FIGS. 3-5 illustrate example views that are displayed by mobile device 104 in response to receiving corresponding view definitions in replies from the CRM.

With continuing reference to FIG. 2, FIG. 3 illustrates an example view 302 that is displayed on a touch sensitive screen 300 of mobile device 104 in response to a user's initial invocation of a mobile session with the CRM. More particularly, when the user first invokes the mobile session, mobile device 104 generates and sends a request for a springboard view. In response to receiving the request, control logic 206 selects the springboard page definition in memory 202. After some processing, control logic 206 sends the springboard view definition to the mobile device in a reply. Mobile device 104 receives and subsequently displays view 302 with actionable springboard view components 306-310 after receiving the reply.

When springboard view 302 is displayed by mobile device 104, the user can request additional views for display on mobile device 104 via activation of springboard view components 306-310. To illustrate, the user can activate "Contacts" in order to retrieve a list of the contacts for review. In response to activation of Contacts, mobile device 104 generates and sends a request for the contacts list view to the CRM. View requests may include a session identification or other information that uniquely identifies the session between the CRM and mobile device 104. The CRM and/or control logic 206 can use session identifications to manage view navigation stacks for respective mobile devices, which in turn can be used to select the proper page definition and components needed to form the reply.

Continuing with the illustrated example, control logic 206 receives the contacts list view request from mobile device 104, and in response selects the contacts list page definition from memory 202. Control logic 206 selects and merges components (e.g., contact names) from model 204 that are needed for the reply. The component selection may be based on information in the selected page definition and/or other information. In the current example, control logic 206 selects contact names that are identified directly or indirectly by the contacts page definition. Components selected and retrieved are merged by control logic 206 with the contacts page definition to create a view definition. In creating the view control logic 206 may also selectively and logically inserts URIs based on the page definition, the components selected for merger with the page definition, etc., before the view definition is sent to the mobile device in a reply. Control logic 206 sends mobile device 104 a reply that contains the contacts view definition after some additional processing. The additional processing may include adding an archive to the reply. An archive may contain one or more additional preexisting view definitions or view definitions created by the control logic 206.

The relevant portion of an example contacts list view definition sent to mobile device 104 in a reply, which includes inserted URIs, is provided below.

---

Contacts List View Definition

```

<list>
        <entry action="contacts?_ctrl.state=zxy1&source=abc"
        targetUri="view:/contacts/101#detail"
            fieldUri="model:/contacts/101/name"
            fieldNameUri="model:/contacts#name"
            entityUri="model:/contacts/101"
            collectionUris="model:/contacts"
            >Labron James</entry>
        <entry action="contacts?_ctrl.state=zxy1&source=def"
        targetUri="view:/contacts/102#detail"
            fieldUri="model:/contacts/102/name"
            fieldNameUri="model:/contacts#name"
            entityUri="model:/contacts/102"
            collectionUris="model:/contacts"
            >Mike Adams</entry>
        ...
    </list>

```

---

In addition to containing the contacts view definition, the reply sent by control logic 206 may also include an archive containing a contacts dynamic client view (DCV). As will be more fully described below, a DCV includes executable instructions or statements (e.g., EL statements) that when executed on a mobile device, enables the mobile device to create and display dynamic views while the mobile device is offline or lacks data communication with the CRM. DCVs can enable mobile devices to: sort (e.g., alphabetically) and display components such as contacts, accounts, opportunities, etc., that are locally stored; search locally stored components and display the results thereof; etc., while the mobile devices are in the offline mode. A relevant portion of an example contacts DCV included in an archive of the illustrated reply to the contacts view request is provided below.

Contacts DCV

```
<pageList viewUri="view://contacts#list">
    <panelList>
        <query value="#{bindings.query}">
            <commands>
                <query>
                    <action action="#{bindings.executeQuery.invoke}"/>
                </query>
                <reset>
                    <action action="#{bindings.resetQuery.invoke}"/>
                </reset>
            </commands>
        </query>
        <sections>
            <iterator value="#{bindings.iterator.rangeSet}" var="entity">
                <entry>
                    <commands>
                        <primary>
                            <action action="#{entity.views['crm://contacts#detail'].url}"/>
                        </primary>
                    </commands>
                    <items>
                        <outputText value="#{entity.fields['crm://contacts/name'].value}"/>
                    </items>
                </entry>
            </iterator>
        </sections>
    </panelList>
    <bindings>
        <iteratorBinding id="iterator" value="#{Model.collections['crm://contacts'].entities}">
            <sortCriteria>
                <sortCriteria attribute="crm://contacts/name" ascending="true" ignoreCase="true"/>
            </sortCriteria>
        </iteratorBinding>
        <queryBinding id="query" iterator="#{bindings.iterator}">
            <queryCriteria>
                <queryCriteria attribute="crm://contacts/name"/>
            </queryCriteria>
        </queryBinding>
        <actionBinding id="executeQuery" binding="#{bindings.query}" action="execute"\>
        <actionBinding id="resetQuery" binding="#{bindings.query}" action="reset"\>
    </bindings>
</pageList>
```

The contents of an archive are not rendered for display, at least initially. Rather, they can be stored in memory on the mobile device as will be more fully described below. Although DCVs can be identified as a view definition, DCVs are not rendered and displayed on a mobile device. Rather, DCVs can be executed to generate views for subsequent rendering and display while the mobile device is in the offline state.

FIG. 4 shows an example contacts list view 402 displayed by mobile device 104 after it receives the illustrated reply from CRM. Many components displayed in a view are actionable. For example, the "Labron James" component can be user activated (e.g., "clicked") to request a corresponding view that provides contact details for Labron James. To illustrate, in response to activation, mobile device 104 generates and sends a request for the Labron James detail view to the CRM. Control logic 206 receives this request, and selects the Contact page definition based on information in the request. Control logic 206 selects components (e.g., the account name associated with the contact) identified directly or indirectly by the Contact page definition. The selected components are merged with the Contact page definition, URIs are added, and the result is transmitted to mobile device 104 in a reply after some additional processing. A relevant portion of an example contact view definition for Labron James received by mobile device 104 is provided below.

Labron James Contact View Definition

```
<page title="Contact" subtitle="Labron James"
ViewUri="view:/contacts/101#detail">
    <form>
        <entry label="Name"
            fieldUri="model:/contacts/101/name"
            fieldNameUri="model:/contacts#name"
            entityUri="model:/contacts/101"
            >Labron James</entry>
        <entry label="Account"
            action="contact?_ctrl.state=zxy2&source=abc"
            targetUri="view:/accounts/201#detail"
            fieldUri="model:/contacts/101/accountName"
            fieldNameUri="model:/contacts#accountName"
            sourceUri="model:/accounts/201/name"
            entityUri="model:/accounts/201"
            collectionUri="model:/accounts">
            Acme Bike Corp.</entry>
        ...
    </form>

```

With continuing reference to FIGS. 1 and 2, FIG. 5 shows an example of the Labron James contact view 502 displayed by mobile device 104 after it receives and renders the reply from the CRM. View 502 illustrates detail contact components displayed in a form format. View 502 has a look and feel of other views displayed by mobile device 104 such as the view 402 shown in FIG. 4. For example, both views 402 and 502 include a "Back" button that can be used to backward navigate to a prior view. If the Back button of view 502 is activated, mobile device 104 will generate and send a back request to the CRM. In one embodiment, the same generic back request is sent by mobile device 104 whenever any back button in any view is activated. In response to the back request, the control logic 206 can pop the last item off the view navigation stack, which item includes information related to view 502. Then, control logic 206 can recreate the reply that resulted in view 402, using the page definition (e.g., Contacts page definition) in the most recently added stack item, and components from the model. The reply is recreated for subsequent transmission to the mobile device 104. The redisplay of the view should be the same except for any component from the logical data model that has changed in the interim.

Like the contacts view definition example and the contacts DCV example above, the Labron James contact view definition example includes URIs such as view URIs, target view URIs, and model URIs. As will be more fully described, mobile devices, like mobile device 104, can store view definitions and DCVs from the CRM, like the contacts DCV, contacts list view definition, and the LaBron James contact view definition examples above, in local memory to enable offline rendering and display of views.

The view and target view URIs can provide a view graph that defines a relationship between views that enables a user to navigate between views on his mobile device while the user's mobile device is offline. Target view URIs are linked to actionable components within view definitions. For example, the "Acme Bike Corp" component above is linked to the "view:/accounts/201#detail" target view URI. When a user clicks a displayed view component while the mobile device is offline, a view definition linked to a target view URI can be retrieved from local memory and subsequently rendered for display.

The model URIs enable a model graph in memory of mobile device 104. In one embodiment, the model graph may take form in database tables that are accessible by SQL statements. The model graph enables mobile device to create composite view definitions, search for components and display of results, sort components and display results, reconciliation of components, etc., while mobile device 104 is offline.

Most of the time, mobile devices such as mobile device 104 shown in FIG. 1 are in data communication with the CRM such as the CRM executing on server 106. While "online" or in data communication, mobile device can receive view definitions from the CRM for subsequent rendering and display. However, data communication between the CRM and a mobile device may be interrupted either voluntarily or involuntarily. For example, mobile device 104 may have a feature (e.g., "airplane mode") that allows the user to voluntarily disable wireless communication, or the mobile device may be too far away from a communication tower to exchange radio signal communications.

Figure 6:
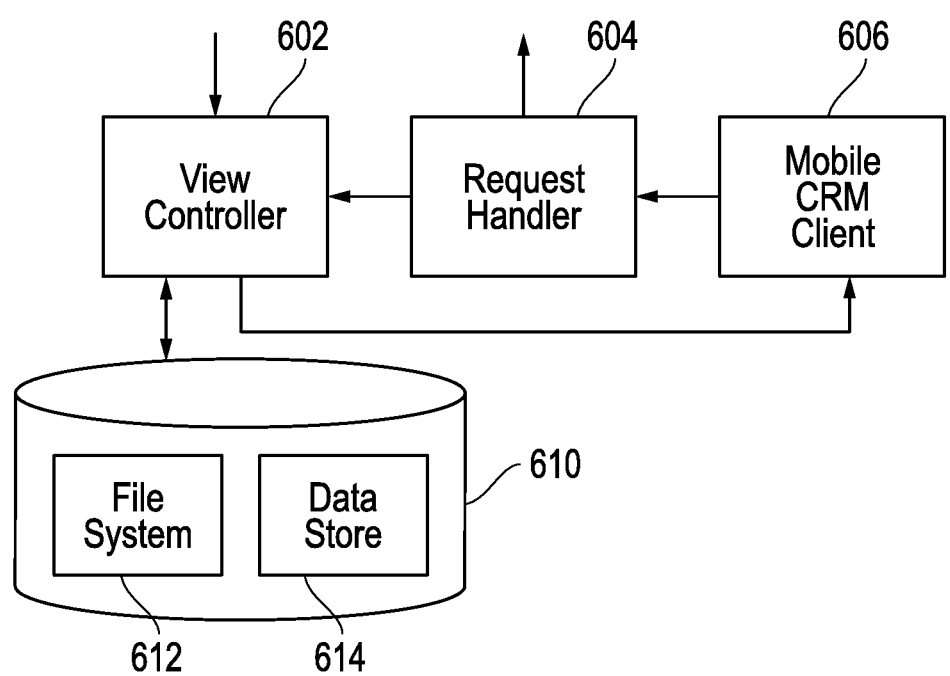
FIG. 6 is a block diagram illustrating relevant components of an example mobile device.

FIG. 6 illustrates relevant components of mobile device 104 that enables offline access to CRM data and/or services according to one embodiment of the present invention. More particularly, FIG. 6 shows, in block diagram form, a view request handler 604 in data communication with a view controller 602 and a mobile CRM client 606. In one embodiment, components 602-606 may take form in instructions executing on one or more processors of mobile device 104. Additionally, FIG. 6 shows memory 610 that is configured to store a file system 612 and a data store 614. In one embodiment, the file system 612 is accessible by the view controller 602 and is configured to store view definitions in respective files identified by respective URLs or addresses. Data store 614 may take form in a database that stores one or more tables such as a views table more fully described below. The data base tables are accessible by the view controller 602 and configured to store the model graph mentioned above.

Figure 7A:
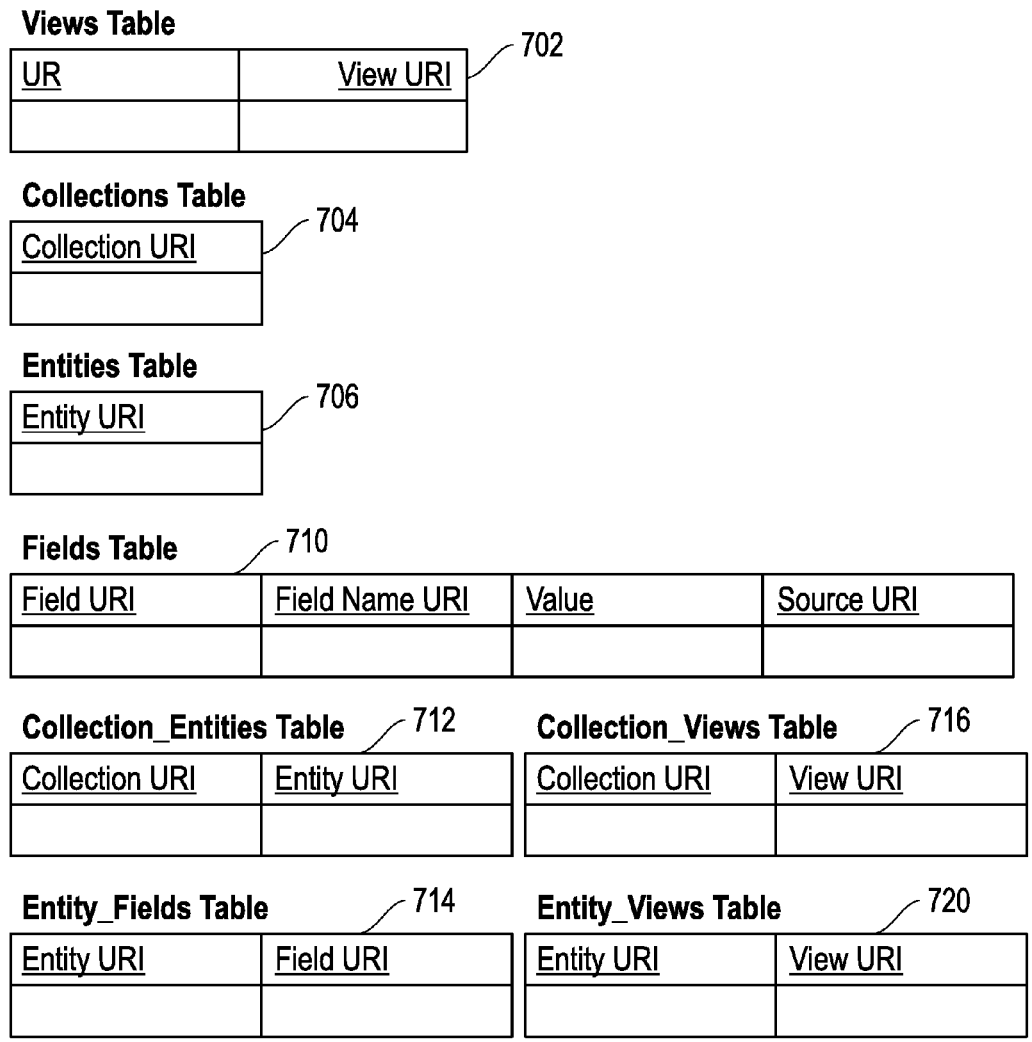

FIG. 7A illustrates example tables, including tables 702-720, stored in data store 614 in their initial or empty state. Additional or fewer tables are contemplated in other embodiments. The views table 702 maps view URIs to URLs for files in file system 612 that store view definitions corresponding to the view URIs. Table 704-720 store model URIs. Some of these tables such as the collections tables 704 and the entities table 706 contain entries with only one model URI. The remaining tables 706-720 contain entries that map model URIs to other model URIs, values (e.g., view components), and/or view URIs. For example, the fields table 706 maps field URIs to field name URIs, component values, and source URIs. It is noted that within the fields table 706 a field URI is mapped to either a value or a source URI, but not both. The collection_entities table 712, entity_fields table 714, collection_views table 716, and entity_views tables 720 are one-to-many intersection tables that map model URIs or view URIs. These tables map URIs as designated by their titles. In other words, the collection_entities table 712 maps collections URIs to entity URIs, and the entity_views table 720 maps entity URIs to view URIs Mobile CRM client 606 generates requests for views, such as the request for the contacts list view mentioned above, in response to user activation of displayed, actionable view components. Request handler 604 receives the requests and is configured to forward the requests to the CRM if the mobile device 104 is online or in data communication with the server 106. Otherwise, request handler 604 forwards the view requests to view controller 602 as will be more fully described below.

Figure 8:
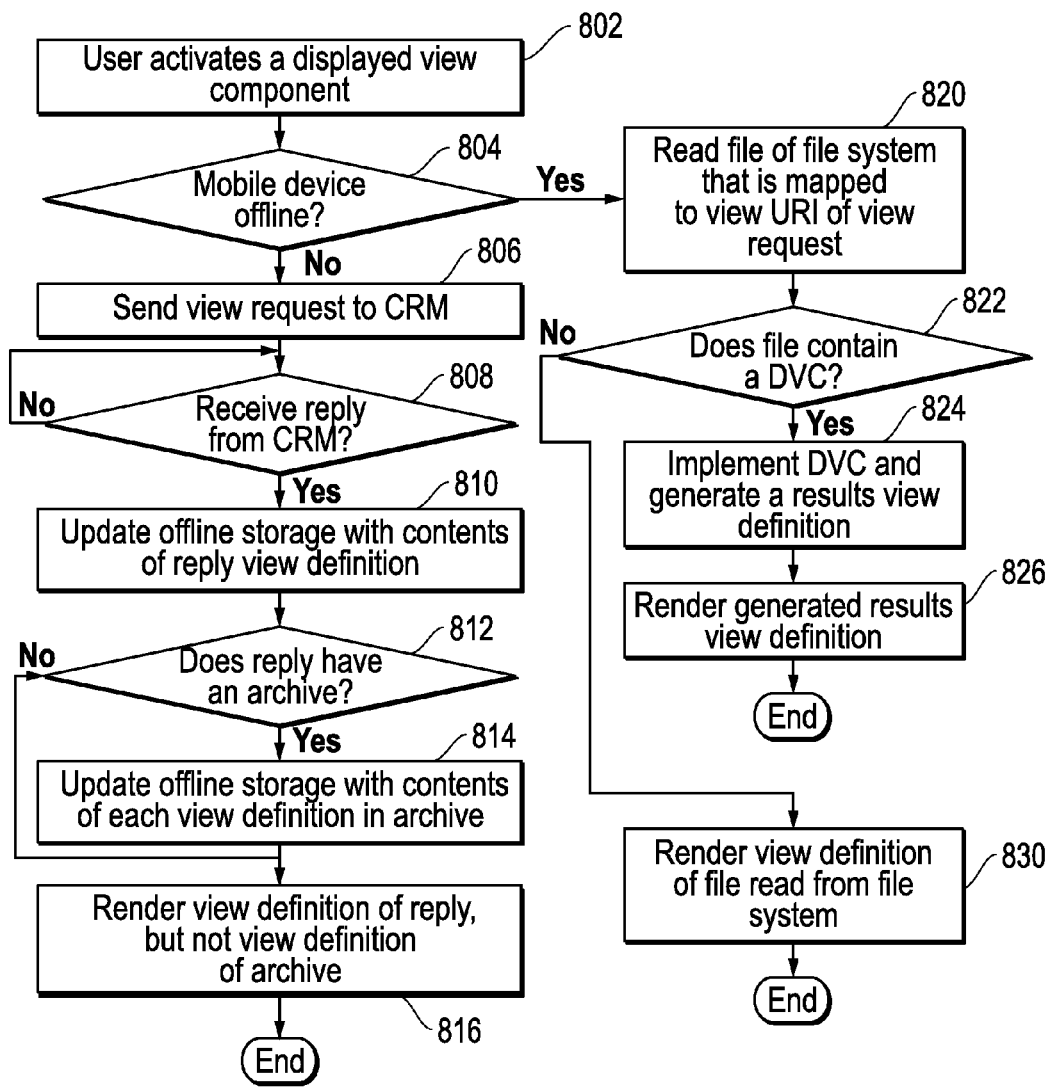
FIG. 8 is a flow chart illustrating relevant aspects of a process implemented by the mobile device of FIG. 6.

FIG. 8 illustrates an example process employed by the view controller 602 and request handler 604 to enable offline access to CRM data and/or services. The process begins when a user mobile device 104 activates (e.g., clicks) a displayed, actionable view component of a rendered view definition. The activated view component is presumed to be linked to a separate view definition via a target view URI. In response to user activation, the mobile CRM 606 generates a view request corresponding to the activated view component. The view URI linked to the activated component may be included in the request received by the request handler 604.

Request handler 604 can determine if mobile device 104 operates in the online or the offline mode when the view request is received. If the mobile device 104 operates in the online mode, the process proceeds to step 806 where the request handler 604 sends the view request to server 106, and eventually, the view controller 602 will receive a reply, which includes a view definition for the requested view. Additionally, the reply may contain an archive that contains additional view definitions, including a DCV such as the example contacts DCV noted above. Initially, view definitions contained within the archive are not displayed. However, they are used to update the data store 614 and/or file system 612 when received.

In step 810, view controller 602 updates file system 612 and data store 614 with the contents of the reply view definition. An example procedure for updating file system 612 and data store 614 with the contents of a view definition will be more fully described with reference to FIGS. 11 and 12. Once the view controller 602 has updated file system 612 and data store 614, the process shown in FIG. 8 proceeds with view controller 602 determining whether the reply contains an archive. If an archive is contained in the reply, then the view controller 602 updates file system 612 and data store 614 with each view definition in the archive using the process shown in FIGS. 11 and 12. If the reply lacks an archive, then the view definition of the reply is presented to mobile CRM client 606 for rendering and subsequent display as shown in 816, and the process ends.

When the process handler 604 receives the view request from mobile CRM client 606 while in the offline mode, the request handler 604 forwards the request to view controller 602, which in turn accesses the views table 702 to read a URL mapped to the view URI of the view request. Using this URL, the view definition contained in the file identified by the URL is read from file system 612 and provided to the view controller 602. View controller 602 determines whether the view definition is a DCV as shown in step 822. If not, then view controller 602 forwards the view definition to the mobile CRM client for rendering and display. In one embodiment, before the view controller forwards the view definition, view controller 602 can reconcile components in the view definition with components in the data store 614 using a reconciliation process such as the example reconciliation the process shown in FIG. 14 as will be more fully described below.

If the file does contain a DCV, the process shown in FIG. 8 proceeds to step 824 where the DCV is implemented by the view controller 602. Although not shown, the view controller may include an engine (e.g., an EL engine) that executes instructions of the DCV. Moreover, although not shown, the view controller 602 may include a database management system that generates queries (e.g., SQL queries) that are used to access tables within data store 614. Some of these queries can be generated by the EL engine in accordance with instructions executed by the EL engine. View controller 602, while executing a DCV, can generate a results view definition which in turn is provided to mobile CRM 606 for subsequent rendering and display.

Figure 11:
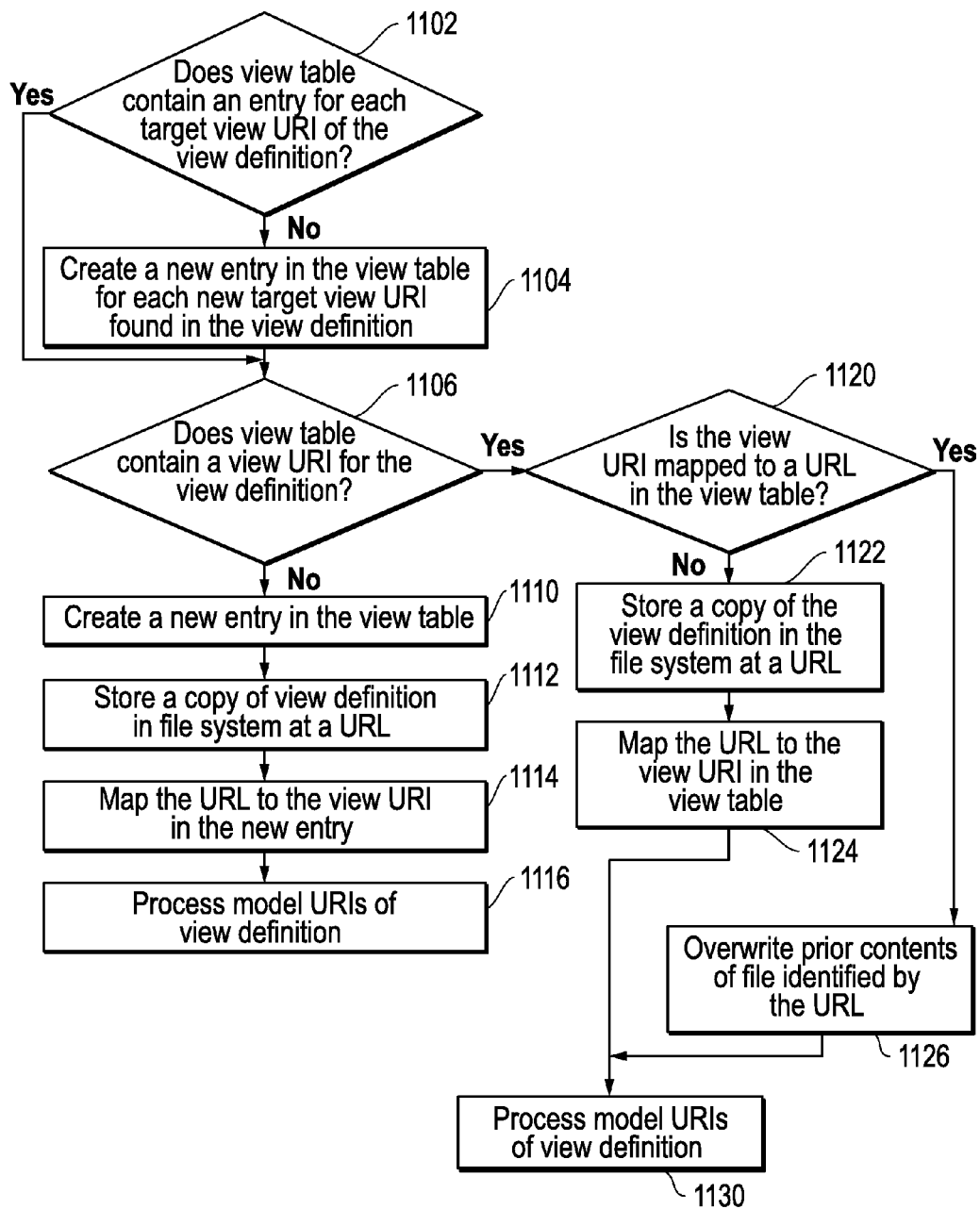
FIG. 11 is a flow chart illustrating relevant aspects of a process implemented by the mobile device of FIG. 6.
Figure 12A:
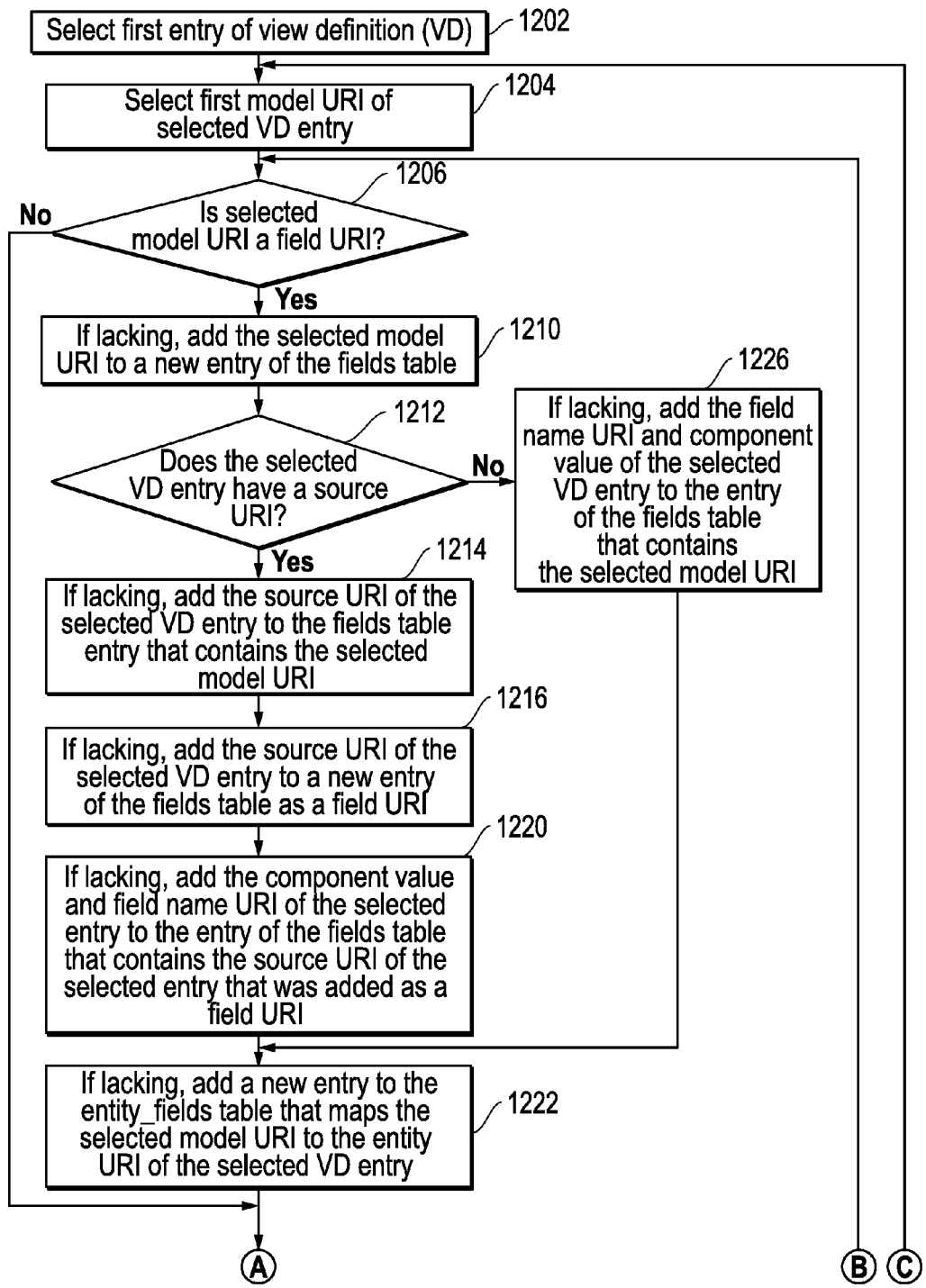
FIGS. 12A and 12B, is a flow chart illustrating relevant aspects of a process implemented by the mobile device of FIG. 6.
Figure 12B:
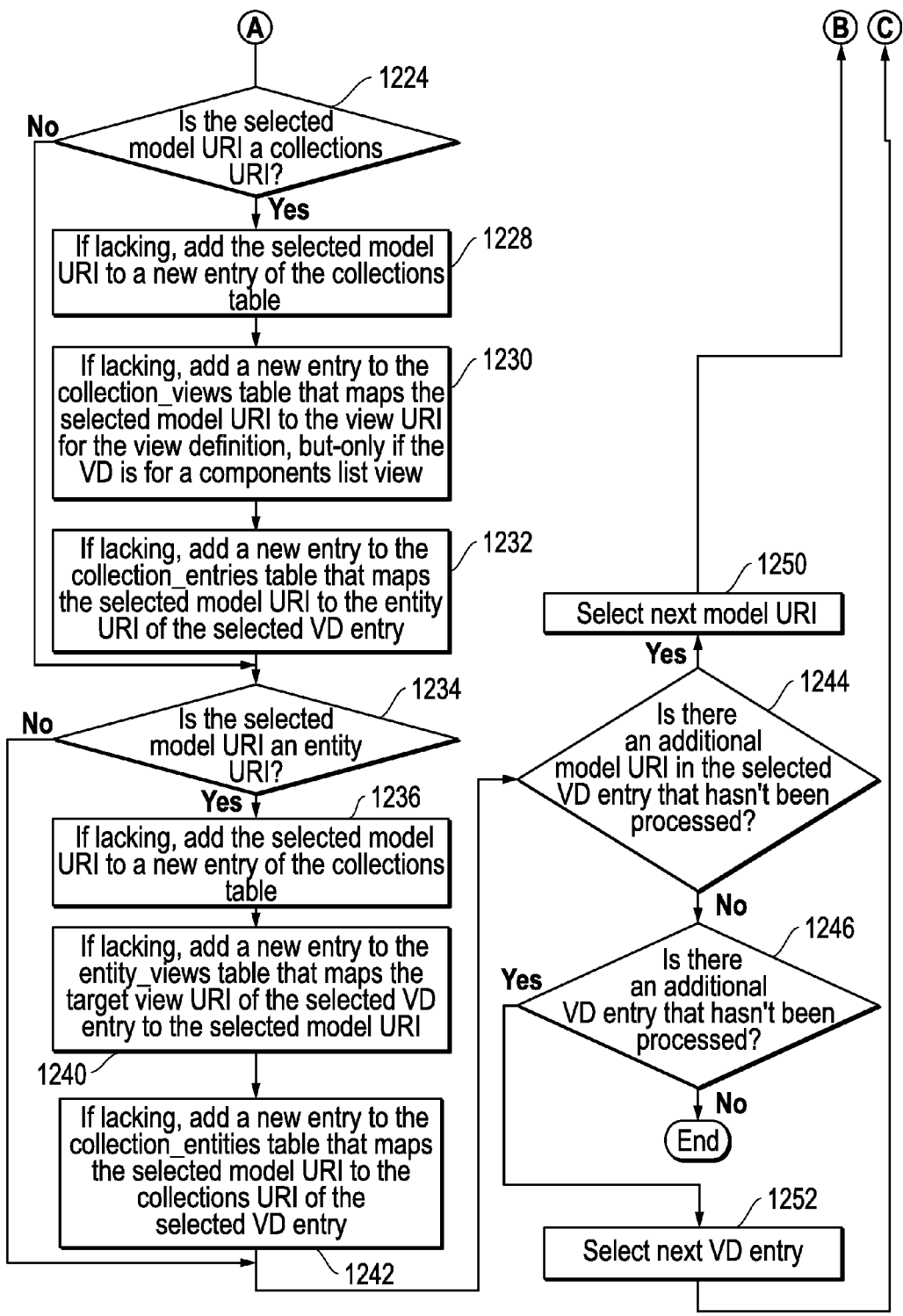

As noted above, FIGS. 11 and 12 illustrate example processes for updating file system 612 and data store 614 at steps 810 or 814 of FIG. 8. The process in FIG. 11 is used to update views table 702 and file system 612. The process in FIG. 12 is used to update tables in data store 614.

The process shown in FIG. 11 begins with view controller 602 accessing the views table 702 to determine whether it contains an entry for each of the target view URIs of the view definition. At step 1104 the view controller creates a new entry in views table 702 for each new target view URI contained within the view definition. In other words, if the views table 702 lacks an entry for the target view URI of the view definition, view controller 602 creates a new entry in the views table into which the new target view URI is added. Ultimately, after the target view URIs of the view definition are processed, the process proceeds to step 1106 where the view controller 602 determines whether the views table contains a view URI for the view definition. If the views table lacks this URI, view controller creates a new entry in the views table into which the view URI is added. The view controller 602 stores a copy of the view definition of interest in file system 612. The view controller 602 then maps the view URI to the URL for the file into which the view definition copy was stored. Thereafter, the process proceeds to FIG. 12, which is more fully described below.

However, if it is determined in step 1106 that the views table 702 does contain the view URI for the view definition, the process proceeds to step 1120 where view controller 602 accesses the views table to see if a URL is mapped to the URI for the view definition. If there is a URL mapped to this URI, the process proceeds to 1126 where the contents identified by the URL, are overwritten with the view definition. It is noted that in this step, a DCV such as the example contacts DCV above, may overwrite a view definition such as the contacts list view definition example above when both definitions are contained in the same reply from server 106.

If the views table lacks a URL mapped to the view URI of the view definition, view controller 604 stores the view definition in a file identified by a URL, and view controller 604 maps the URL to the view URI in the views table. After step 1124 or in response to overwriting a prior version of the view definition in step 1226, view controller 602 processes the model URIs of the view definition in accordance with the process shown in FIG. 12 more fully described below.

FIG. 12 illustrates an example process for updating the model URI tables with the contents of a view definition. The model tables enable many features of offline mobile CRM processing including offline searching, offline sorting, offline component reconciliation, offline creation of dynamic views, etc. With reference to the example Labron James contact definition above, the process of FIG. 12 begins when view controller 602 selects the first entry (e.g., the entry that contains component "Labron James") of the view definition. It is noted that in one embodiment, each entry of the view definition contains a single view definition component such as "Labron James."

In step 1204, view controller 602 selects the first model URI of the selected component. This can be a field URI, a field name URI, a source URI, an entity URI, or a collections URI. Other model URIs are contemplated. View controller 602 can determine the selected model URI type. If the selected model URI is a field URI, the process proceeds to step 1210 where view controller 602 adds the selected model URI as a field URI to the fields table 706, unless the table already contains an entry with the selected model URI. In step 1212, the view controller determines whether the selected entry contains a source field URI in step 1212. If not, view controller 602 adds and maps the component value and the field name URI of the selected view definition entry to the field URI.

If view controller 602 determines the selected view definition entry does have a source field URI in step 1212, then steps 1214-1220 are implemented. These steps configure the fields table to reconcile values in accordance with the process shown in FIG. 14, which will be more fully described below. In step 1214, view controller 602 maps the source field URI to the field URI in the fields table if need be. It is noted the field URI may be mapped to the source URI within the table prior to step 1214 due to a prior implementation of the process shown within FIG. 12. In step 1216, view controller 602 adds the source field URI of the selected entry to the fields table as a field URI, unless the source field URI exists in the views table as a field URI prior to step 1216. In step 1220, the component of the selected view definition entry and its field name URI are added to the views table entry that contains the source field URI in the field URI column. In one embodiment, an existing component value in the fields table is updated with the component value of the selected entry if these component values differ. In response to step 1220 or 1226, view controller 602 adds a new entry to the entity_fields table 720 that maps the selected model URI to the entity URI of the selected view definition entry, unless the entry was previously contained in the table.

If it is determined in step 1206 that the selected model URI is not a field URI, the process proceeds to step 1224 where the view controller 602 determines whether the selected model URI is a collection URI. If it is, then the view controller implements steps 1228-1232. If not, then the process proceeds to step 1234 where the view controller 602 determines whether the selected URI is an entity URI. Presuming that this condition is met, steps 1236-1242 are implemented. If not, or in response to implementing step 1242, the view controller 602 determines in step 1244 whether additional model URIs are contained within the selected view definition entry. If there is another model URI, it is selected in step 1250, and steps 1206-1244 are repeated with the newly selected model URI. If there is no more model URIs in the selected view definition entry, the view controller 602 determines whether the view definition contains additional entries. If so, the next entry is selected in step 1252 and steps 1204-1246 are repeated with the newly selected view definition entry.

FIG. 7B shows the data store in FIG. 7A after view controller 602 processes the example contacts list view definition example above in accordance with FIGS. 8, 11 and 12. The reply of the illustrated example that contains the contacts list view definition example, also contains an archive having the example DCV above. In accordance with the processing of FIG. 8, the file identified by the URL=file:// . . . contacts#list will initially contain the contacts list view definition, but will be later overwritten with the example DCV. FIG. 7C shows the data store in FIG. 7B after view controller 602 processes the example Labron James contact view definition above in accordance with FIGS. 8, 11, and 12.

Although not indicated in FIG. 7C, file system 612 of mobile device 104 stores a view definition for the springboard view shown in FIG. 3. This view definition can be rendered and displayed on mobile device 104 while mobile device 104 is in the offline mode, and this displayed springboard view should be similar to that shown in FIG. 3. View controller 602, file system 612, and data store 614 enable offline CRM services including offline display of views on mobile device 104. To illustrate, presume the user of mobile device 104 activates "Contacts" of the springboard view (see FIG. 3) while mobile device 104 is in the offline mode. In response, the mobile CRM client 606 generates a request for the contacts view definition. This request will include the view URI (i.e., views://contacts#list) that is linked to the Contacts view component of the rendered springboard view definition. Since mobile device 104 is offline, request handler 604 will forward the request from the mobile CRM client to the view controller 602 in accordance with the process shown in FIG. 8. In response, view controller 602 accesses views table 702 shown in FIG. 7C to read the URL (i.e., file:\\ . . . contacts#list) that is mapped to the view URI (i.e., views://contacts#list) of the request. View controller 602 retrieves the contacts list view definition stored at the mapped URL. This view definition, however, is a DCV (i.e., the example contacts DCV above). The view controller can implement this DCV in accordance with the process shown in FIG. 13, which will be more fully described below. Ultimately the view controller will generate a results view definition, which is eventually forwarded to mobile CRM client 606 for rendering and display.

Figure 9:
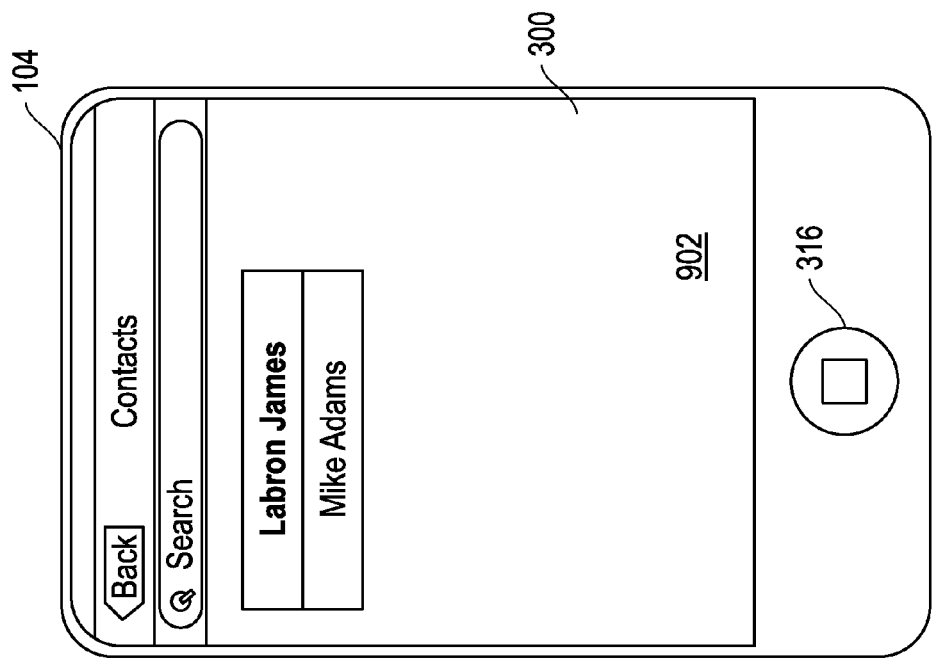
FIG. 9 graphically illustrates an example page displayed on a mobile device employed in FIG. 1.

FIG. 9 illustrates an example contacts list view that is displayed by mobile device 104. Before a view definition is rendered and displayed, view controller 602 can access the views table 702 to identify target view URIs in the view definition that are mapped to URLs. The displayed view definition will include visual indication identifying those view components that are actionable, i.e., components mapped to target view URIs that were previously identified by view controller 602 as mapped to URLs in the views table 702. In one embodiment, displayed view components that are actionable are bolded by the mobile device 104. In the example shown in FIG. 9, the LaBron James contact view component is bolded, thus indicating that this component is actionable.

Figure 10:
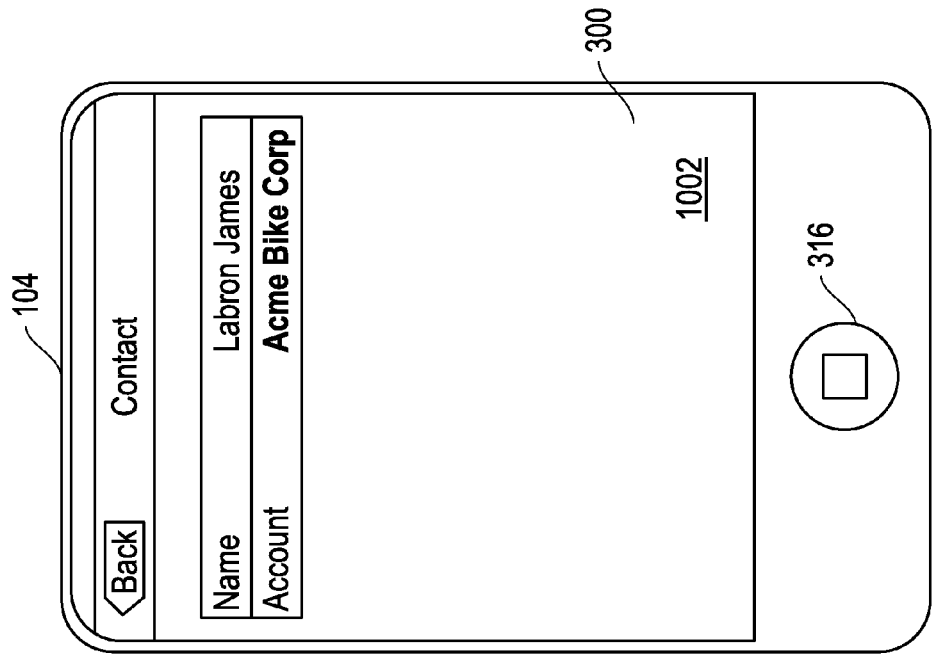
FIG. 10 graphically illustrates an example page displayed on a mobile device employed in FIG. 1.

In response to a user activating an actionable component such as the LaBron James component displayed in FIG. 9, the mobile CRM 606 acting in accordance with the process shown in FIG. 8 generates a view request for the LaBron James contact definition view. This request will include the view URI (i.e., view//contacts/101#detail), which is linked to the "LaBron James" component within the rendered and displayed contacts list view definition. Since mobile device 104 is offline, this request is provided to view controller 602, which in turn reads the LaBron James contact view definition from the file system definition at the mapped URL (i.e., file:// . . . contacts/101#detail). This contact view definition is forwarded to the mobile CRM client 606 for subsequent rendering and display. FIG. 10 illustrates the LaBron James contact view displayed by mobile device 104 while mobile device 104 is in the offline mode.

A DCV can be executed by view controller 602 to generate a view definition for subsequent rendering and display while mobile device operates in the offline mode. The view definition may depend on input provided by a user via mobile device 104; different inputs to a DCV executing on view controller 602 may result in different view definitions. When executing a DCV, view controller 602 can select components from the value column of the fields table 710 according to some selection criteria (select all contacts or all contacts beginning with "L"), optionally sort the selected components according to another criteria (e.g., sort alphabetically), and create a results view definition with entries that contain the selected components, respectively. Once created, the results view definition can be rendered for display on mobile device 104. FIG. 9 illustrates an example view that was displayed in response to view controller 602 implementing the example DCV above.

Figure 13:
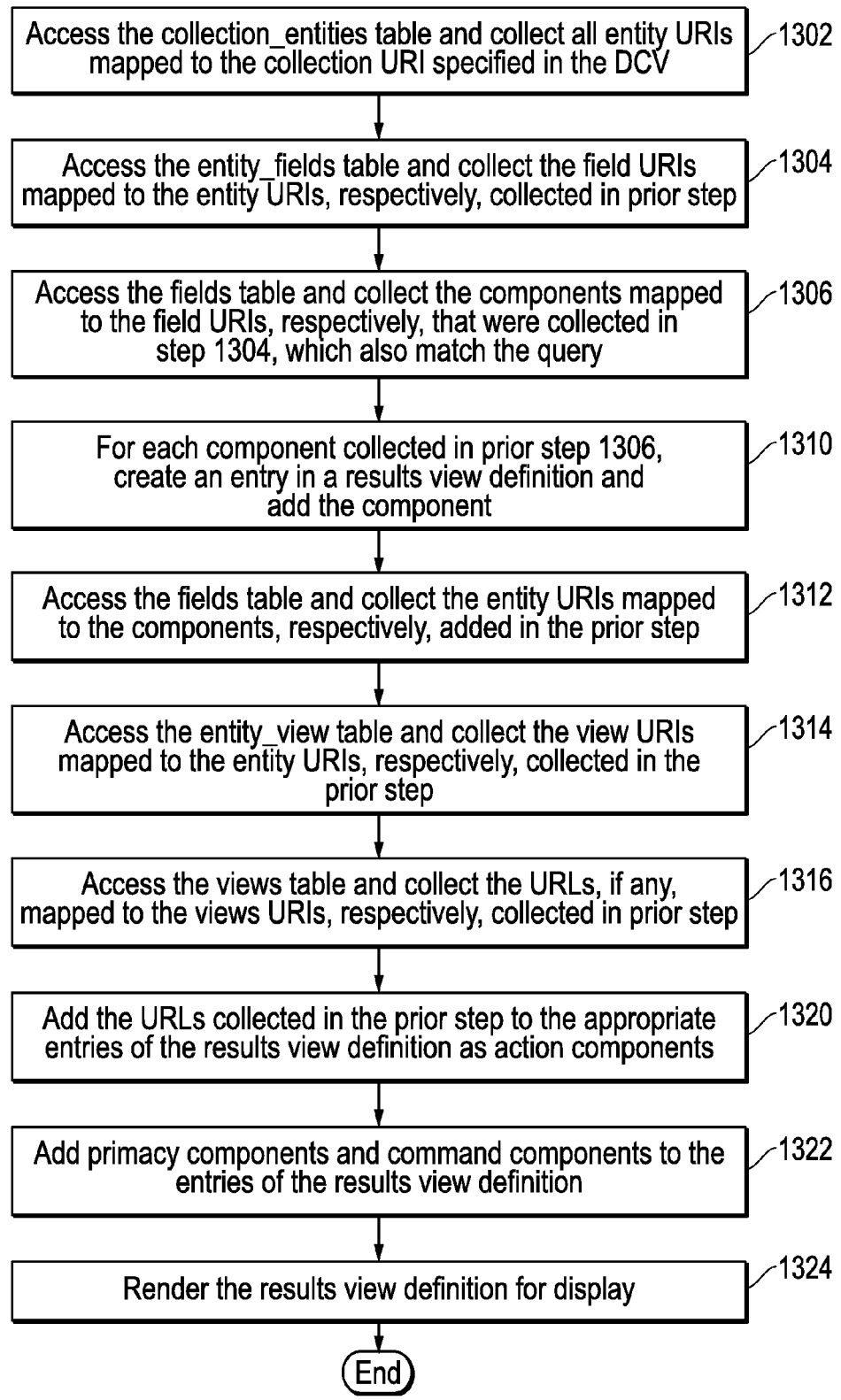
FIG. 13 is a flow chart illustrating relevant aspects of a process implemented by the mobile device of FIG. 6.

FIG. 13 illustrates an example process performed by view controller 602 in response to implementing a DCV such as the example DCV above. When a DCV is read from file system 612 in accordance with step 820 of FIG. 8, view controller 602 accesses the collection_entities table and collects all entity URIs mapped to the collection URI specified in the DCV as shown in step 1302. To illustrate, the specified collection URI in the example DCV above is "contacts." In step 1304 the view controller 602 accesses the entity_fields table and collects the field URIs mapped to the entity URIs, respectively, that were collected in step 1302. This collection of field URIs can be used to identify one or more components that may placed into a results view definition.

In some offline views, such as the view shown FIG. 9, a search field is available into which the user can enter a search term. After a search term is entered and a search button activated, the search term is provided to the view controller 602 for use in the process shown in FIG. 13. More particularly, view controller 602 accesses fields table 710 and collects components from the value column that are: identified by the field URIs form step 1304, and; meet a search term entered by the user of mobile device 104. If no search term has been entered by the user, a null is presumed, and view controller in step 1306 collects all values mapped to the field URIs, respectively, that were collected in step 1304. When the null search term is used, the view controller 602 may sort the components collected in step 1306. In one embodiment, the components are sorted alphabetically.

For each value collected in step 1306, the view controller creates an entry in a results view definition and adds a respective component collected in step 1306. In step 1312, view controller 602 accesses the fields table 710 and collects the entity URIs mapped to the components, respectively, collected in step 1306. Thereafter, view controller 602 accesses the entity_views table 720 and collects the view URIs mapped to the entity URIs, respectively, collected in step 1312. The views table 702 is accessed to collect the URLs if any, mapped to the view URIs, respectively, collected in step 1314, and these URLs are added to the appropriate entries of the results of view definition as action items. Eventually, primacy components and command components are also added to the entries of the results view definition. The results view definition is provided by view controller 602 to the mobile CRM client for rendering and display.

Figure 14:
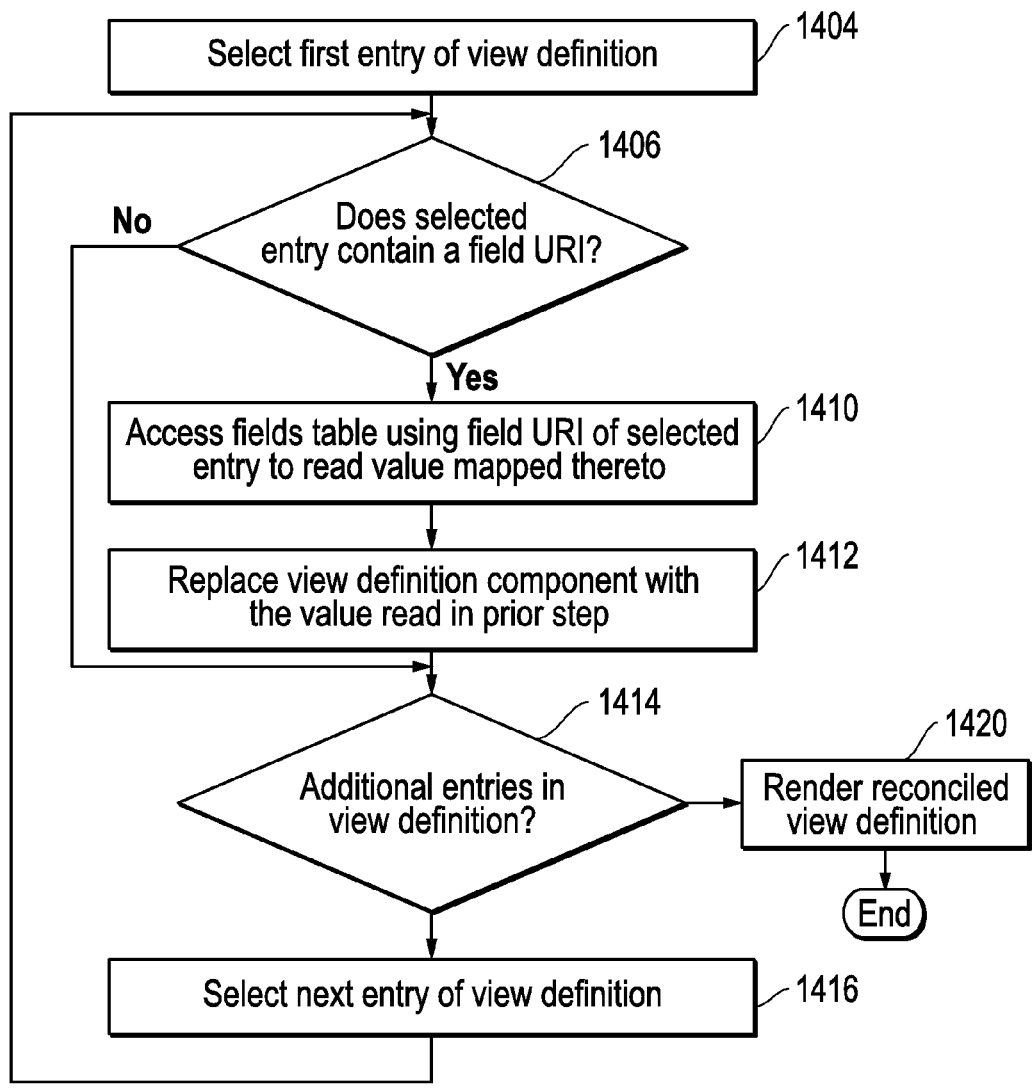
FIG. 14 is a flow chart illustrating relevant aspects of a process implemented by the mobile device of FIG. 6.

As noted above, mobile device 104 is capable of reconciling view components to ensure that the user is presented with the latest or most up to date components in data store 614, even when not processing DCV views. FIG. 14 illustrates an example process implemented by view controller 602 for reconciling components when rendering and displaying views. This process can be implemented by the view controller before the view controller forwards a requested view definition to mobile CRM client 606 for rendering and display in steps 816 or 830 of FIG. 8. To illustrate the process shown in FIG. 14, presume mobile device 104 receives the following example account view definition from server 102 after receiving the example contacts list view definition and the example Labron James contact view definition above.

---

Acme Corp view definition

---

```
<page title="Account" subtitle="Acme Corp"
uri="view:/accounts/201#detail">
    <form>
        <entry label="Name"
            fieldUri="model:/accounts/201/name"
            fieldNameUri="model:/accounts#name"
            entityUri="model:/accounts/201"
            >Acme Corp.</entry>
        <entry label="Contact"
            action="account?_ctrl.state=zxy2&source=abc"
            targetUri="view:/contacts/101#detail"
            fieldUri="model:/accounts/201/contactName"
            fieldNameUri="model:/accounts#contactsnname"
            sourceUri="model:/contacts/201/name"
            entityUri="model:/contacts/101"
            collectionUri="model:/contacts">
            Labron James</entry>
        ...
    </form>

```

---

Figure 15:
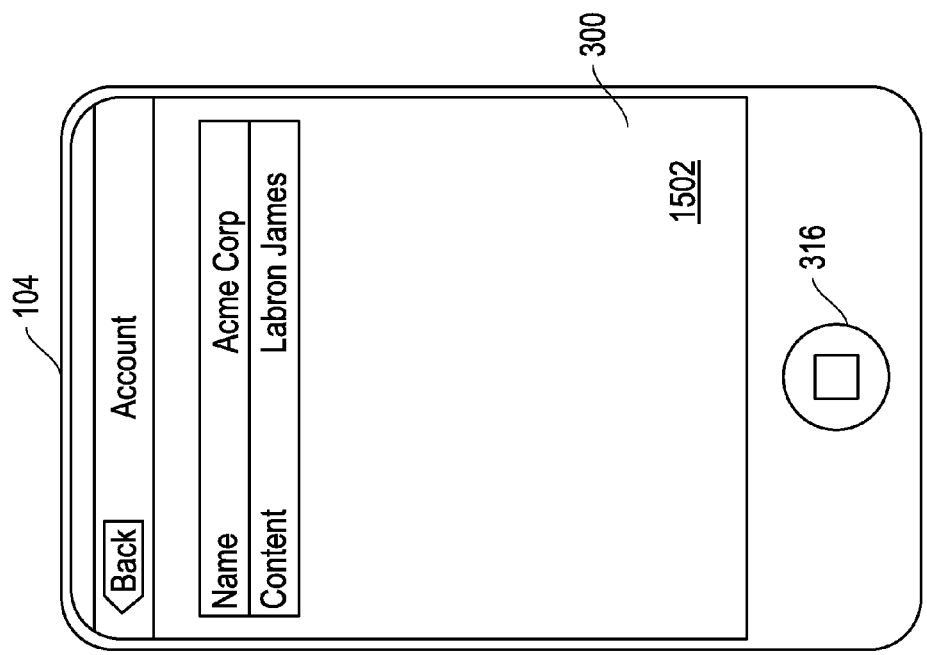
FIG. 15 graphically illustrates an example page displayed on a mobile device employed in FIG. 1.

The Acme Corp view definition is processed by the view controller 602 in accordance with the processes shown in FIGS. 8, 11, and 12. FIG. 7D illustrates data store 614 in FIG. 7C after view controller 602 processes the example Acme Corp contact view definition above in accordance with the process shown in FIG. 12. In executing the process shown in FIG. 12, view controller 602 updates fields table 710 by overwriting "Acme Bike Corp" with "Acme Corp" as shown in FIG. 7D. FIG. 15 illustrates the view corresponding to the example Acme Corp view definition. This view shows that Labron James is the contact for "Acme Corp.," not "Acme Bike Corp" as shown in FIG. 10.

Figure 16:
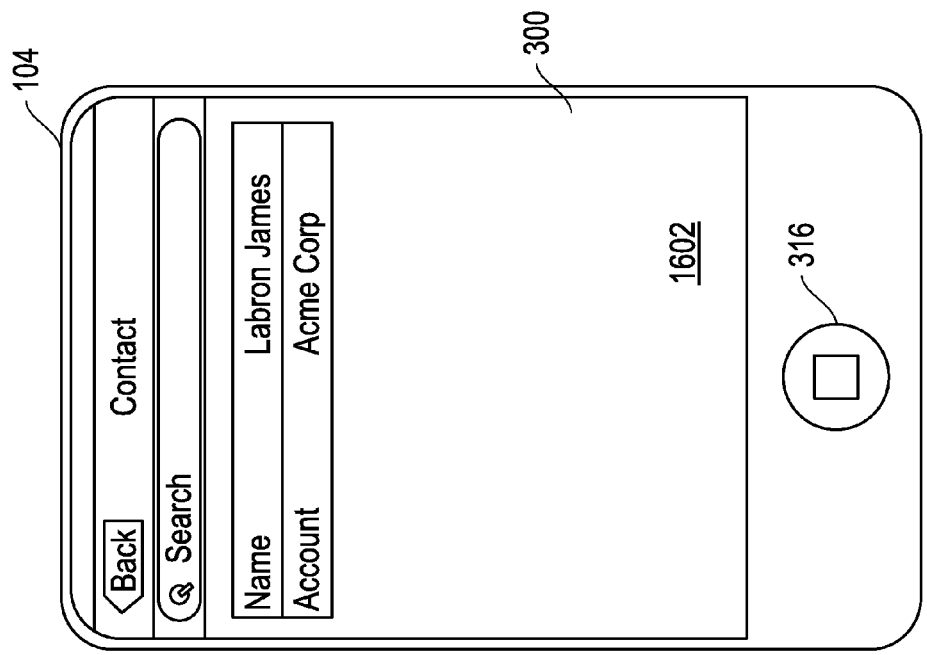
FIG. 16 graphically illustrates an example page displayed on a mobile device employed in FIG. 1.

Suppose mobile device 104 then goes offline, the user activates the "Contacts" component of the springboard view, and then activates the "Labron James" component of the contacts list view that is displayed in response to activating Contacts. Mobile device 104 can implement the process shown in FIG. 8 and render the view definition read from file system 612 as shown in step 830. However, before the view definition is forwarded for rendering and display, view controller 602 performs the reconciliation process of FIG. 14. FIG. 16 illustrates the view after implementing the process shown in FIG. 14. As shown, the account name has been updated to be "Acme Corp" not "Acme Bike Corp" as shown in FIG. 10.

Mobile device 104 may have a feature, called "export data" that allows a user to download and locally store several related view definitions. For example, a user may seek to download most or all view definitions for views (contacts, opportunities, calendar events, etc.,) associated with a particular account. These view definitions, or components thereof, can be rendered and displayed by mobile device 104 while in the offline mode. Thus, when the user activates this feature, the mobile device can generate a view request for, eg., an account, and all associated view definitions. Server 102 will send a reply to the mobile device that contains the account view definition, and an archive that contains view definitions for respective contacts, opportunities, etc., associated with the account. View controller 602 can update file system 612 and data store 614 with the contents of the view definitions of the archive in accordance with the processes shown in FIGS. 11 and 12.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    generating a request by a mobile device;
    determining that the mobile device is in an online state;
    receiving a response to the request, wherein
        the response comprises a first universal resource indicator;
    updating a plurality of tables stored in a memory of the mobile device, wherein the updating comprises
        adding the first universal resource indicator to a first table of the plurality of tables; and
        wherein the updating comprises adding a part of the response to the first table of the plurality of tables;
    generating a second request by the mobile device;
    determining that the mobile device is in an offline state; and
    generating a local response to the second request based on the plurality of tables stored in the memory of the mobile device, wherein
        the generating the local response to the second request is performed based on the determining that the mobile device is in an offline state.

2. The method of claim 1 wherein the updating further comprises adding the universal resource indicator to a second table of the plurality of tables.

3. The method of claim 1 further comprising:
storing some or all of the response in memory of the mobile device at an address;
mapping the address to an identifier in a third table of the plurality of tables.

4. The method of claim 3 wherein the identifier is contained in the response.

5. The method of claim 4 wherein the updating further comprises adding the identifier to another table of the plurality of tables.

6. The method of claim 3 wherein the updating further comprises adding a second tag of the response to a second table of the plurality of tables, and adding the identifier to the second table.

7. A memory storing instructions, wherein a mobile device implements a method in response to executing the instructions, the method comprising:
generating a request;
determining that the mobile device is in an online state;
receiving a response to the request, wherein
the response comprises a first universal resource indicator;
updating a plurality of tables stored in a memory of the mobile device, wherein the updating comprises
adding the first universal resource indicator to a first table of the plurality of tables; and
wherein the updating comprises adding a part of the response to the first table of the plurality of tables;
generating a second request by the mobile device;
determining that the mobile device is in an offline state; and
generating a local response to the second request based on the plurality of tables stored in the memory of the mobile device, wherein
the generating the local response to the second request is performed based on the determining that the mobile device is in an offline state.

8. The memory of claim 7 wherein the updating further comprises adding the universal resource indicator to a second table of the plurality of tables.

9. The memory of claim 7 wherein the method further comprises:
storing some or all of the response in memory of the mobile device at an address;
mapping the address to an identifier in a third table of the plurality of tables.

10. The memory of claim 9 wherein the identifier is contained in the response.

11. The memory of claim 10 wherein the updating further comprises adding the identifier to another table of the plurality of tables.

12. The memory of claim 9 wherein the updating further comprises adding a second tag of the response to a second table of the plurality of tables, and adding the identifier to the second table.

13. A method comprising:
transmitting instructions to a mobile device for storage in memory thereof;
wherein the mobile device is configured to implement another method in response to
executing the instructions, the other method comprising:
generating a request;
determining that the mobile device is in an online state;
receiving a response to the request, wherein
the response comprises a first universal resource indicator;
updating a plurality of tables stored in a memory of the mobile device, wherein
the updating comprises
adding the first universal resource indicator to a first table of the plurality of tables; and
wherein the updating comprises adding a part of the response to the first table of the plurality of tables;
generating a second request by the mobile device;
determining that the mobile device is in an offline state; and
generating a local response to the second request based on the plurality of tables stored in the memory of the mobile device, wherein
the generating the local response to the second request is performed based on the determining that the mobile device is in an offline state.

14. The method of claim 13 wherein the updating further comprises adding the universal resource indicator to a second table of the plurality of tables.

15. The method of claim 13 wherein the other method further comprises:
storing some or all of the response in memory of the mobile device at an address;
mapping the address to an identifier in a third table of the plurality of tables.

16. The method of claim 15 wherein the identifier is contained in the response.

17. The method of claim 13 wherein the updating further comprises adding the identifier to another table of the plurality of tables.

18. The method of claim 1, wherein the first universal resource indicator defines a contacts list view definition.

19. The method of claim 1, wherein the first universal resource indicator defines a springboard view definition.

20. The method of claim 1, wherein
the first universal resource indicator enables one or more features to be displayed by a mobile device when the mobile device is in the offline state, wherein
the one or more features comprise at least one of
offline searching,
offline sorting,
offline component reconciliation, and
offline creation of dynamic views.

* * * * *

UNITED STATES PATENT AND TRADEMARK OFFICE
CERTIFICATE OF CORRECTION

PATENT NO. : 9,456,335 B2
APPLICATION NO. : 14/068790
DATED : September 27, 2016
INVENTOR(S) : Carter et al.

It is certified that error appears in the above-identified patent and that said Letters Patent is hereby corrected as shown below:

In the Specification

In Column 8, Line 29, after "view URIs" insert -- . --.

Signed and Sealed this
Thirteenth Day of June, 2017

Joseph Matal
*Performing the Functions and Duties of the
Under Secretary of Commerce for Intellectual Property and
Director of the United States Patent and Trademark Office*